United States Patent
Baumann

[11] Patent Number: 6,027,159
[45] Date of Patent: Feb. 22, 2000

[54] MOTOR VEHICLE HAVING A BODY SUPPORT STRUCTURE

[75] Inventor: Karl-Heinz Baumann, Bondorf, Germany

[73] Assignee: DaimlerChrysler AG, Stuttgart, Germany

[21] Appl. No.: 08/939,115

[22] Filed: Sep. 26, 1997

[30] Foreign Application Priority Data

Sep. 26, 1996 [DE] Germany .................. 196 39 565

[51] Int. Cl.⁷ .................................................. B60R 21/00
[52] U.S. Cl. ............................................................. 296/189
[58] Field of Search ............................................. 296/189

[56] References Cited

U.S. PATENT DOCUMENTS

| | | | |
|---|---|---|---|
| 3,671,068 | 6/1972 | Gerhard | 296/189 |
| 3,848,886 | 11/1974 | Feustel et al. | 296/189 |
| 3,888,502 | 6/1975 | Felzer et al. | |
| 4,684,151 | 8/1987 | Drewek | 296/189 |
| 5,348,113 | 9/1994 | Drvota et al. | |
| 5,566,777 | 10/1996 | Trommer et al. | 296/189 |
| 5,772,245 | 6/1998 | Mühlhausen | 296/189 |

FOREIGN PATENT DOCUMENTS

| | | |
|---|---|---|
| 854157 | 10/1952 | Germany . |
| 2256491 | 5/1974 | Germany ................ 296/189 |
| 40 22 137 | 1/1992 | Germany . |
| 42 20 438 | 12/1993 | Germany . |
| 4220438A1 | 12/1993 | Germany . |
| 42 27 967 | 3/1994 | Germany . |
| 438884 | 4/1992 | Japan . |
| 781509 | 3/1995 | Japan . |

OTHER PUBLICATIONS

International Search Report, dated Jan. 6, 1998.

*Primary Examiner*—Gary C. Hoge
*Attorney, Agent, or Firm*—Evenson, McKeown, Edwards & Lenahan, P.L.L.C.

[57] ABSTRACT

A passenger car has a vehicle body with a passenger compartment and support structure including a collision responsive deformable front zone in front of the passenger compartment, a deformable rear zone behind the passenger compartment and at least one deformable center zone aligned to the passenger compartment and integrated in the vehicle body support structure and also effective in the longitudinal direction of the vehicle. The deformable center zone includes corrugations in passenger compartment floor structure members.

18 Claims, 3 Drawing Sheets

MOTOR VEHICLE HAVING A BODY SUPPORT STRUCTURE

BACKGROUND AND SUMMARY OF THE INVENTION

This application claims the priority of German application 196 39 565.8-42 filed in Germany on Sep. 26, 1996, the disclosure of which is expressly incorporated by reference herein.

The invention relates to a motor vehicle having a vehicle body support structure which has a passenger compartment, and having a deformable front zone arranged in front of the passenger compartment and effective in the longitudinal direction of the vehicle and a deformable rear zone arranged behind the passenger compartment and effective in the longitudinal direction of the vehicle.

Motor vehicles of this type are generally known in the form of passenger cars. In the event of a frontal impact of the passenger car or in the event of a rear impact onto the passenger car, the deformable front zone and the deformable rear zone have the purpose of reducing impact energy to such an extent that the passenger compartment itself is not deformed. In comparison to the deformable zones, the passenger compartment has a much stiffer design and has an essentially rigid behavior. Particularly in the event of very serious frontal impact loads, the driver-side and/or the front passenger-side front area of the passenger compartment may also deform which may considerably reduce the survival space of the front-side vehicle occupants.

From German Patent Document DE 42 20 438 A1, a compact car is known which has a flexible center part which, according to the requirement, can be retracted or extended. In the extended condition, the center part provides room for an additional seat bench or for additional storage space.

It is an object of the invention to provide a motor vehicle of the initially mentioned type which, particularly in the event of serious impact accidents, provides the vehicle occupants with an increased survival space.

This object is achieved in that at least one deformable center zone, which is integrated into the vehicle support structure and is also effective in the longitudinal direction of the vehicle, is assigned to the passenger compartment. The solution according to the invention therefore advantageously provides an energy reduction within the passenger compartment itself. As a result, a corresponding impact load must not be absorbed exclusively by the deformable front zone or by the deformable rear zone so that, particularly in the event of serious frontal impact loads, intrusions of the front area of the passenger compartment and therefore a reduction of the survival space of the front-side vehicle occupants can be avoided. Naturally, the at least one deformable center zone is arranged such within the passenger compartment that also the survival space for vehicle occupants in a rear area is not significantly reduced because of this deformable zone. On the one hand, the solution according to the invention has important advantages in the event of very serious impact loads in that intrusions in the front area of the vehicle occupant compartment are avoided by an energy absorption in the area of the at least one deformable center zone within the vehicle occupant compartment itself. On the other hand, the solution according to the invention is also suitable for improving the compatibility between very large and very small passenger cars since, when the solution according to the invention is used, the very large passenger cars are provided with an enlarged energy absorption path which reduces the impact accelerations for a small passenger car in the event of a collision with this very large passenger car. The solution according to the invention therefore achieves a considerable improvement of the passive safety of a motor vehicle.

As a further development of the invention, the at least one deformable center zone is provided in the transition area between seat positions of the passenger compartment arranged behind one another in the longitudinal direction of the vehicle at least at the level of the floor structure of the passenger compartment. This further development is based on the fact that a space is available in the transition area between seat positions arranged behind one another which is not required for the survival space of the respective vehicle occupants on the rearward seat positions so that the providing of a deformable center zone in this area has no disadvantageous effect on the rear vehicle passengers. In the case of a four-seat passenger car, the deformable center zone is situated in the transition area between the front-side and the rear-side seat positions. In the case of a large-capacity sedan which has more than two rows of seats arranged behind one another, two or more deformable center zones may also in each case be provided in the transitions areas between the seat positions which adjoin one another in the longitudinal direction of the vehicle.

In a further development of the invention, the deformation resistance of the at least one deformable center zone is coordinated such with the deformable front and rear zones that the deformable center zone does not become effective before at least the deformable front zone or the deformable rear zone is used at least partially for the absorption of energy. This ensures that the deformable center zone is used exclusively in the event of serious impact loads so that, in the event of low or medium impact loads, the passenger compartment remains stiff and repairs will be required only with respect to the deformable front zone or the deformable rear zone.

In a further development of the invention, the deformable center zone has weakenings at defined points of the floor structure. The weakenings can be achieved either by means of a correspondingly flexible design of the support parts of the floor structure at the defined points or by an additional stiffening of the remaining relevant areas of the floor structure, whereby the unreinforced areas automatically form weakenings in the sense of this further development.

As a further development of the invention, several deformation corrugations are provided as weakenings which are arranged behind one another in the longitudinal direction of the vehicle and which are integrated in the floor structure of the passenger compartment. The floor structure includes the lateral chassis members as well as the vehicle floor and optionally a transmission tunnel provided for, a propeller shaft. Deformation corrugations can be provided without any major cost expenditures within the floor structure made of pressed sheet metal parts. Because of the fact that deformation corrugations are provided only in the area of the floor structure and not in the area of the roof structure, the passenger compartment is pushed together only in the area of the floor structure at whose level the main forces are introduced and buckles in the upward direction in the area of the roof structure. As a result, the portion of the passenger compartment which is in the rear in the direction of the impact load will tip by a certain amount. This has advantages in the event of a frontal impact because a submarining effect for the rear passengers is reduced because of the increased tilting of the seat surfaces of the rear seats as the result of the tipping of the rear-side portion of the passenger compartment.

In a further development of the invention, the deformation corrugations of the floor structure are arranged in the transition area between lateral B-columns and a rear seat cross member. This is a particularly favorable positioning of the deformation corrugations because, even in the event of a deformation in this area, the rear occupants still have sufficient survival space.

In a further development of the invention, the floor structure has deformation elements which are positioned in the area of the front ends of lateral chassis members facing the front wheels. This further development is advantageous particularly in the event of an offset frontal impact because the correspondingly loaded front wheel will act early upon the deformation element preferably developed as an impact absorbing element and will thus concentrate the impact forces on the assigned lateral chassis member. Since the corresponding weakenings for the deformable center zone are also provided in this lateral chassis member, the deforming of this deformable zone is promoted by this further development.

Other objects, advantages and novel features of the present invention will become apparent from the following detailed description of the invention when considered in conjunction with the accompanying drawings.

DETAILED DESCRIPTION OF THE DRAWINGS

Figure 1:
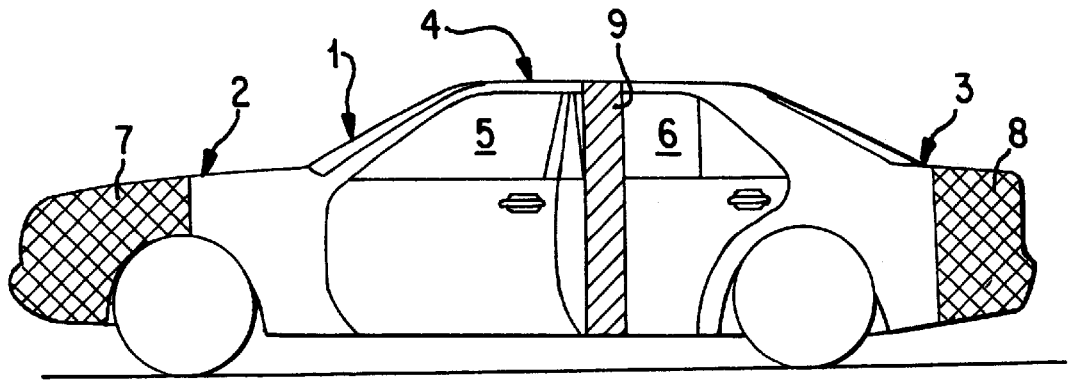
FIG. 1 is a schematic lateral view of an embodiment of a passenger car according to the invention which, in addition to a deformable front and rear zone, is provided with a deformable center zone.

A passenger car 1 according to FIG. 1 represents a four-door notchback sedan whose vehicle body has a forward structure area 2, a rearward structure area 3 as well as a passenger compartment 4 arranged between the forward structure area 2 and the rearward structure area 3. The passenger compartment 4 is divided into a front area 5 and a rear area 6 which are each provided with front-side and rear-side seat positions. A front section of the forward structure area 2 of the vehicle body is designed as a deformable front zone 7. A rear-side section of the rear area 3 of the vehicle body is designed as a deformable rear zone 8. In a transition area between the front area 5 and the rear area 6 of the passenger compartment 4, specifically particularly in a vehicle body section of the passenger compartment 4 directly adjoining the B-column, a deformable center zone 9 is provided which becomes effective only in the case of serious impact loads which may lead to a reduction of the survival space within the front area or the rear area 5, 6 for the vehicle occupants. The deformable center zone 9 therefore becomes effective only at a point in time at which either the deformable front zone 7 or the deformable rear zone 8 has already at least partially deformed. The deformable front zone 7 and the deformable rear zone 8 therefore represent primary deformable zones, and the deformable center zone 9 represents a secondary deformable zone. The deformable center zone 9 is achieved by energy-absorbing deformation elements or sections which are integrated in the vehicle body support structure of the passenger compartment 4. The deformation resistance of these energy-absorbing deformation elements or sections is adapted such to the deformation resistances of the deformable front or rear zones 7, 8 that the deformation elements or sections act as rigid structural elements as long as only slight or medium impact stresses are exercised on the deformable front zone 7 or on the deformable rear zone 8.

Figure 2:
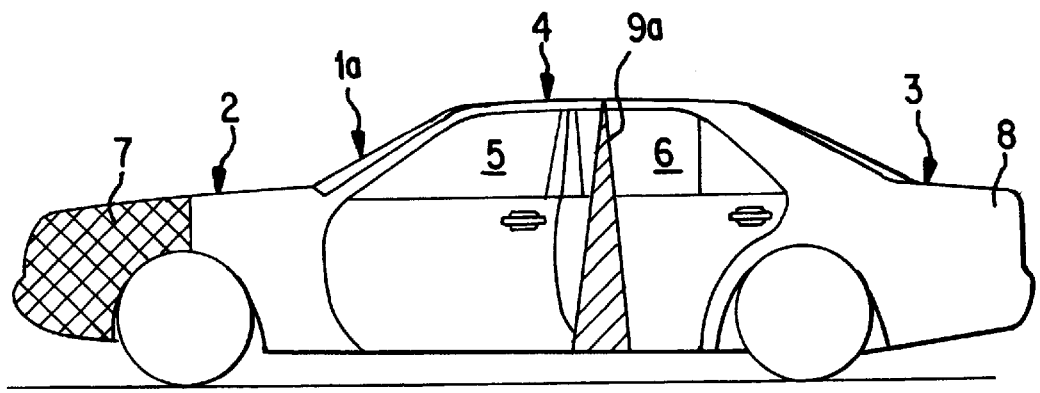
FIG. 2 is a view of another embodiment of a passenger car according to the invention which is provided with a deformable center zone in the area of a passenger compartment which is reduced upwards in a wedge shape to a roof structure.
Figure 3:
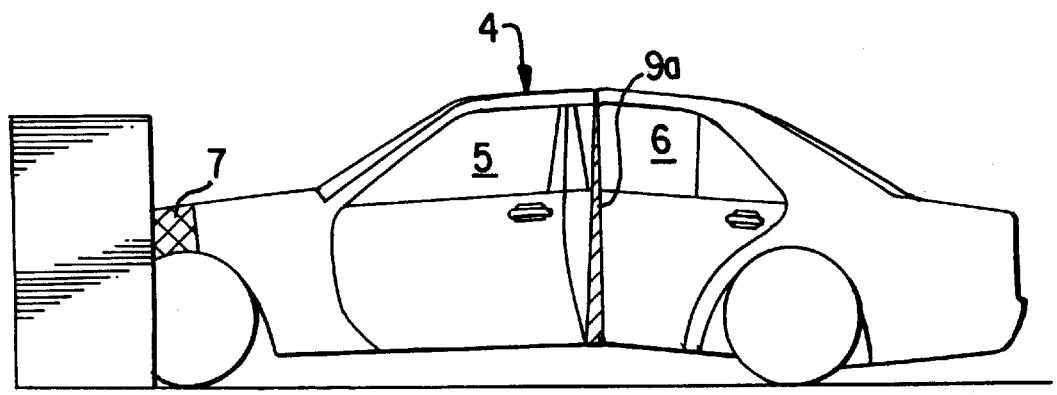
FIG. 3 is a view of the passenger car according to FIG. 2 shown after a frontal impact load because of a collision with an obstacle.

The passenger car 1a according to FIGS. 2 and 3 corresponds essentially to the passenger car 1 according to FIG. 1. The same function areas and structural parts of the passenger car 1a have the same reference number as in the case of the passenger car 1 so that they do not have to be explained in detail. The passenger compartment 4 of the passenger car 1a is also provided with a deformable center zone 9a which, however, in contrast to the deformable zone 9, which from the floor structure to the roof structure of the passenger compartment 4 has the same length dimensions in the longitudinal direction of the vehicle, is reduced in the shape of a wedge from the floor structure to the roof structure. This wedge-shaped reduction of the deformable zone 9a is caused by deformation elements in the area of the floor structure of the passenger compartment 4. The roof structure of the passenger compartment 4 itself is not part of the deformable zone 9a because it has neither deformation elements nor deformation sections. In the event of a frontal impact onto an obstacle, after the complete deformation of the deformable front zone 7, the deformable center zone 9a is therefore used for the absorption of energy, in which case, because of the presence of deformation elements or sections, a bending of the passenger compartment 4 at the level of the deformable center zone 9a occurs only in the area of the floor structure. Because of the bending, the roof structure tips upwards, and the rear area 6 of the passenger compartment 4, including the rear area 3, bends diagonally toward the rear. As the result of this tilting of the rear area 6, the seat surface of the rear seats, which are not shown, is adjusted in a ramp-type manner which reduces a submarining effect for rear occupants situated on these seat surfaces.

Figure 4:
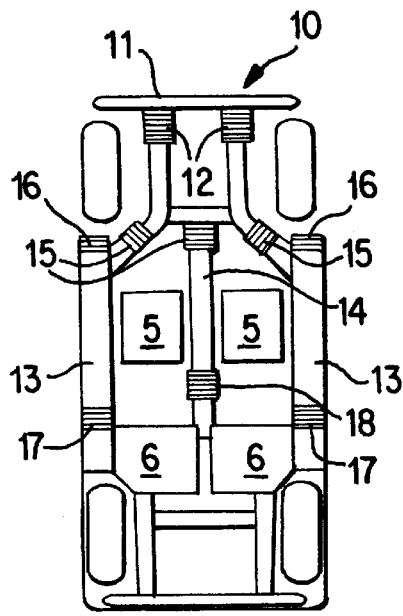
FIG. 4 is a schematic top view of a floor structure of a vehicle body support structure of a passenger car according to the invention.
Figure 5:
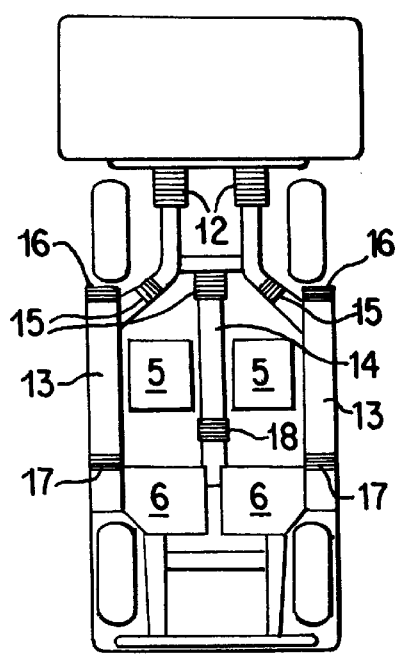
FIG. 5 is a view of the floor structure of FIG. 4 deformed in the case of a centric frontal impact.
Figure 6:
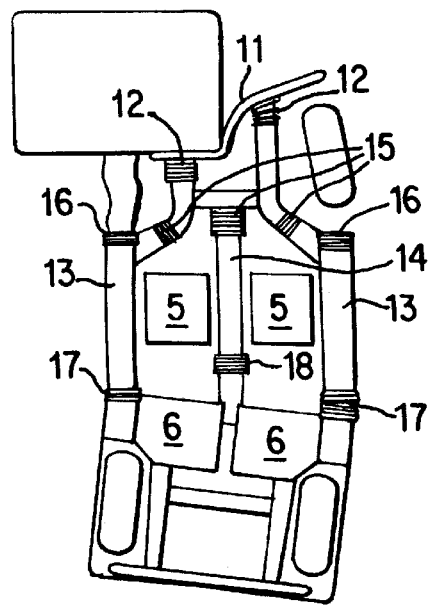
FIG. 6 is a view of the floor structure of FIG. 4 deformed in the case of an asymmetrically offset frontal impact.

In the embodiment according to FIGS. 4 to 6, a floor structure is provided as part of a vehicle body support structure of a passenger car which has a bendable bumper support 11 on the front side which, by means of energy-absorbing deformation elements 12, is connected to two lateral forward-structure chassis parts. The deformation elements 12 represent a part of the deformable front zone of the passenger car. At the level of the passenger compartment, the floor structure has one lateral chassis member 13 respectively on each side. A transmission tunnel 14 extends in the longitudinal direction of the vehicle between the seat positions of the front area 5 and of the rear area 6 of the passenger compartment, which transmission tunnel 14 is provided for receiving a propeller shaft for a rear drive. The lateral forward-structure chassis members lead by means of diagonally outwardly curved lateral chassis member sections into the lateral chassis members 13, in which case two energy-absorbing deformation sections 15 are integrated into these lateral chassis member sections. The transmission tunnel 14 adjoins a forward-structure cross member also by means of an energy-absorbing deformation section 15. On their forward front sides which point to the front wheels, the lateral chassis members 13 each have another energy absorbing deformation element 16. The deformable center zone in the transition area between the front area 5 and the rear area 6 of the vehicle interior of the passenger compartment is formed at the level of the lateral chassis members 13 by one energy-absorbing deformation section 17 respectively which is in each case integrated into the assigned lateral chassis member 13. Approximately at the level of the B-columns, which are not shown, the transmission tunnel 14 is also provided with an energy-absorbing deformation element 18 which divides the transmission tunnel 14 into a forward and a rearward section.

As illustrated in FIG. 5, in the event of a centric frontal impact onto an obstacle, the described energy-absorbing deformation elements and sections 12 to 18 are deformed—as illustrated—, in which case it is shown by means of the illustrated arrows in this area of the deformation sections 17 and of the deformation element 18 that, as the result of the division of the floor structure in the area of the passenger compartment into a forward and a rearward partial area, also the mass of the section of the passenger compartment carrying the rear area 6 is used for the deformation of the deformation elements 17 and 18. In the event of a laterally offset, asymmetrical frontal impact of the passenger car according to FIG. 6, a lateral buckling of the floor structure takes place, in which case the deformation section 17 of the lateral chassis member 13 which is on the right in the top view is stretched and the left deformation section 17 of the left lateral chassis member 13 is compressed to a block.

Figure 7:
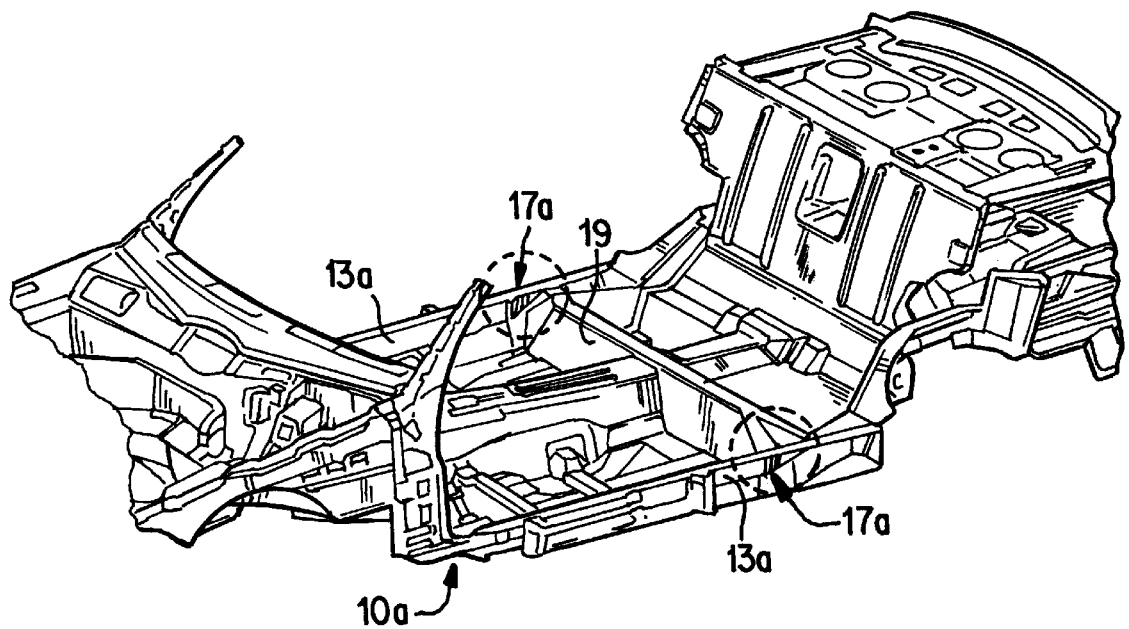
FIG. 7 is a perspective representation of a floor area of a vehicle body support structure for a passenger car according to the invention.
Figure 8:
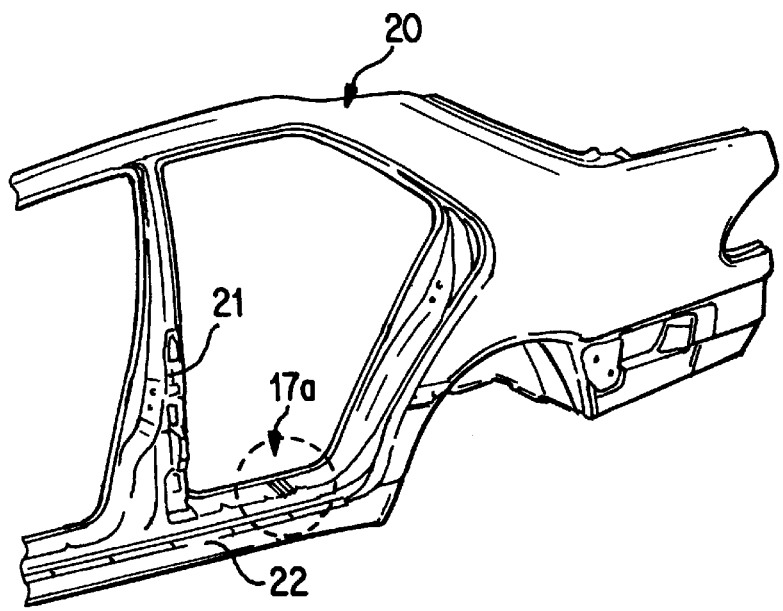
FIG. 8 is a perspective representation of a side panel structure for the vehicle body support structure of the passenger car according to FIG. 7.

In the embodiment according to FIG. 7 and 8, the energy-absorbing deformation sections 17*a* in the floor structure of the illustrated passenger car are implemented by at least two transverse corrugations arranged behind one another in the longitudinal direction of the vehicle directly in front of a rear seat cross member 19, in which case the transverse corrugations causing the weakening are provided in the interior shells of the lateral chassis members 13*a* of the floor structure 10*a* according to FIG. 7 as well as in the exterior shells 22 of the lateral chassis members integrated in a side panel 20 of the vehicle body. For a better illustration of the position of the transverse corrugations 17*a*, the positions of these deformation sections are shown by broken-line circles.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Passenger car having a vehicle body support structure comprising:

a passenger compartment, a deformable front zone arranged in front of the passenger compartment and effective in a longitudinal direction of the vehicle, a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle, wherein the at least one deformable center zone is provided at least at the level of the floor structure of the passenger compartment in a transition area between seat positions of the passenger compartment arranged behind one another in the longitudinal direction of the vehicle, and wherein the at least one deformable center zone has deformation resistance characteristically adapted such to the deformable front and rear zones that the deformable center zone will not become effective before at least the deformable front zone or the deformable rear zone have been used at least partially for the absorbing of energy.

2. Passenger car having a vehicle body support structure comprising:

a passenger compartment, a deformable front zone arranged in front of the passenger compartment and effective in a longitudinal direction of the vehicle, a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle, wherein the at least one deformable center zone has weakenings at defined points of the floor structure.

3. Passenger car having a vehicle body support structure comprising:

a passenger compartment, a deformable front zone arranged in front of the passenger compartment and effective in a longitudinal direction of the vehicle, a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle, wherein the at least one deformable center zone is provided at least at the level of the floor structure of the passenger compartment in a transition area between seat positions of the passenger compartment arranged behind one another in the longitudinal direction of the vehicle, and wherein the at least one deformable center zone has weakenings at defined points of the floor structure.

4. Passenger car according to claim 1, wherein the at least one deformable center zone has weakenings at defined points of the floor structure.

5. Passenger car having a vehicle body support structure comprising:

a passenger compartment, a deformable front zone arranged in front of the passenger compartment and effective in a longitudinal direction of the vehicle, a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle, wherein the deformable center zone includes several deformation corrugations provided as weakenings which are situated behind one another in the longitudinal direction of the vehicle and which are integrated in the floor structure of the passenger compartment.

6. Passenger car according to claim 5, wherein the deformation corrugations of the floor structure are arranged in a transition area between lateral B-columns and a rear-seat cross member.

7. Passenger car having a vehicle body support structure comprising:

a passenger compartment, a deformable front zone arranged in front of the passenger compartment and effective in a longitudinal direction of the vehicle.

a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle, wherein the at least one deformable center zone is provided at least at the level of the floor structure of the passenger compartment in a transition area between seat positions of the passenger compartment arranged behind one another in the longitudinal direction of the vehicle, and wherein the deformable center zone includes several deformation corrugations provided as weakenings which are situated behind one another in the longitudinal direction of the vehicle and which are integrated in the floor structure of the passenger compartment.

8. Passenger car according to claim 1, wherein the deformable center zone includes several deformation corrugations provided as weakenings which are situated behind one another in the longitudinal direction of the vehicle and which are integrated in the floor structure of the passenger compartment.

9. Passenger car having a vehicle body support structure comprising:

a passenger compartment, a deformable front zone arranged in front of the passenger compartment and effective in a longitudinal direction of the vehicle, a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle.

wherein the floor structure extends under the passenger compartment, the floor structure having deformation elements which are positioned in an area of front ends of lateral chassis members facing front wheels of the passenger car.

10. Passenger car having a vehicle body support structure comprising:

a passenger compartment, a deformable front zone arranged in front of the passenger compartment and effective in a longitudinal direction of the vehicle, a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle, wherein the at least one deformable center zone is provided at least at the level of the floor structure of the passenger compartment in a transition area between seat positions of the passenger compartment arranged behind one another in the longitudinal direction of the vehicle, and wherein the floor structure extends under the passenger compartment, the floor structure having deformation elements which are positioned in an area of front ends of lateral chassis members facing front wheels of the passenger car.

11. Passenger car according to claim 1, wherein the floor structure extends under the passenger compartment, the floor structure having deformation elements which are positioned in an area of front ends of lateral chassis members facing front wheels of the passenger car.

12. Passenger car according to claim 9, wherein in a case of a rear-wheel drive passenger car, a deformation element is arranged in a propeller shaft extending below floor structure of the passenger compartment, at the level of the deformable center zone, the deformation resistance of the deformation element being adapted to the deformable zone.

13. Passenger car having a vehicle body support structure comprising:

a passenger compartment, a deformable front zone arranged in front of the passenger compartment and effective in a longitudinal direction of the vehicle, a deformable rear zone arranged behind the passenger compartment and effective in the longitudinal direction of the vehicle, and at least one deformable center zone assigned to the passenger compartment and integrated into the vehicle body support structure and also effective in the longitudinal direction of the vehicle, wherein the at least one deformable center zone is provided at least at the level of the floor structure of the passenger compartment in a transition area between seat positions of the passenger compartment arranged behind one another in the longitudinal direction of the vehicle, and wherein in a case of a rear-wheel drive passenger car, a deformation element is arranged in a propeller shaft extending below floor structure of the passenger compartment, at the level of the deformable center zone, the deformation resistance of the deformation element being adapted to the deformable zone.

14. Passenger car according to claim 1, wherein in a case of a rear-wheel drive passenger car, a deformation element is arranged in a propeller shaft extending below floor structure of the passenger compartment, at the level of the deformable center zone, the deformation resistance of the deformation element being adapted to the deformable zone.

15. Passenger car according to claim 1, wherein lateral roof frames as well as a roof covering of a roof structure of the passenger compartment 4 have integrated deformation sections at a level of the at least one deformable center zone.

16. Passenger car according to claim 5, wherein lateral roof frames as well as a roof covering of a roof structure of the passenger compartment have integrated deformation sections at a level of the at least one deformable center zone.

17. Passenger car according to claim 16, wherein the floor structure extends under the passenger compartment, the floor structure having deformation elements 16 which are positioned in an area of front ends of lateral chassis members facing front wheels of the passenger car.

18. Passenger car according to claim 17, wherein in a case of a rear-wheel drive passenger car, a deformation element is arranged in a propeller shaft extending below floor structure of the passenger compartment, at the level of the deformable center zone, the deformation resistance of the deformation element being adapted to the deformable zone.

* * * * *